United States Patent

Sadler

[11] Patent Number: 5,997,221
[45] Date of Patent: Dec. 7, 1999

[54] CHANNEL RASP

[76] Inventor: Kermit J. Sadler, 1523 Cota Ave., Long Beach, Calif. 90813

[21] Appl. No.: 09/160,471

[22] Filed: Sep. 24, 1998

[51] Int. Cl.⁶ .................................................. B23D 67/00
[52] U.S. Cl. ................. 407/29.1; 407/29.11; 407/29.15; 76/88; 451/524
[58] Field of Search ............................. 407/29.1, 29.11, 407/29.12, 29.13, 29.14, 29.15; 7/158; 76/13, 88; 82/47; 451/344, 354, 356, 523, 524, 525

[56] References Cited

U.S. PATENT DOCUMENTS

| | | | |
|---|---|---|---|
| 806,962 | 12/1905 | Ellis | 407/29.14 |
| 1,165,070 | 12/1915 | Carneal | 76/88 |
| 1,955,848 | 4/1934 | Dunn | 451/523 X |
| 2,589,531 | 3/1952 | Brooks | 451/523 X |
| 4,099,310 | 7/1978 | Mitchell | 407/29.13 |
| 4,937,984 | 7/1990 | Taranto | 451/524 |
| 5,036,627 | 8/1991 | Walters | 451/354 |
| 5,823,719 | 10/1998 | Tyler | 407/29.15 X |

OTHER PUBLICATIONS

Catalog page for wal–board rasp model no. WR–57.

*Primary Examiner*—Andrea L. Pitts
*Assistant Examiner*—Henry W. H. Tsai
*Attorney, Agent, or Firm*—Charles H. Thomas

[57] ABSTRACT

A rasp is formed for removing material at a cut edge of a structure, such as drywall cut to size. Unlike prior drywall rasps, the rasp of the invention is formed with a rigid, channel-shaped grip defining a generally U-shaped, downwardly facing, concave inner channel surface. A rectangular section of expanded metal that forms a grid with a multiplicity of grid openings delineated from each other by a lattice of intervening metal strips is placed into the channel-shaped backing or grip. Lips at the lower extremities of the channel walls are bent upwardly and inwardly to clamp the sheet of expanded metal against the inner surface of the grip. The sheet of expanded metal is thereby permanently secured against the inner surface of the grip. The sheet of expanded metal is bent to conform to the interior surface of the grip. The channel-shaped structure of the rasp is then run along the cut surface of a structure to be finished so as to abrade away material therefrom. Because the rasping element is disposed against the concave, channel-shaped, inner surface of the grip, there is a minimal likelihood of accidental contact between the expanded metal abrading element and anything other than a narrow edge of sheet material purposely inserted into the channel-shaped structure of the rasp. The rasp thereby greatly reduces the likelihood of accidental injury to the user.

9 Claims, 3 Drawing Sheets

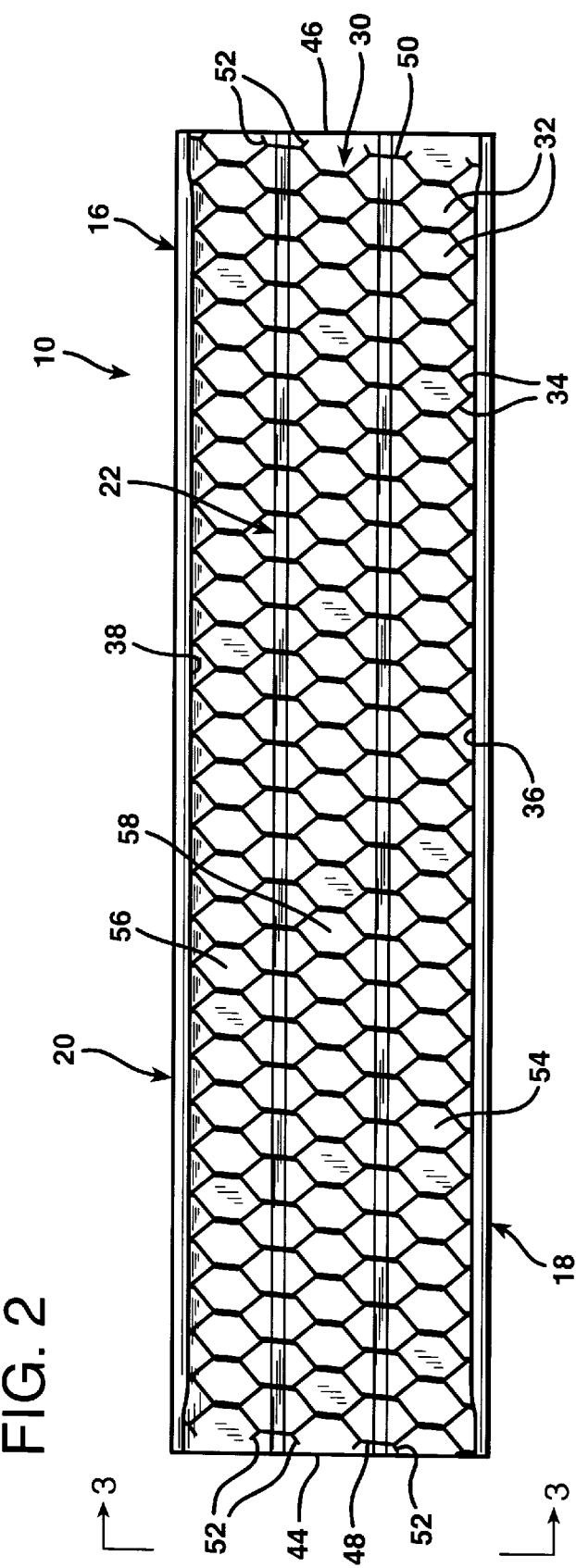
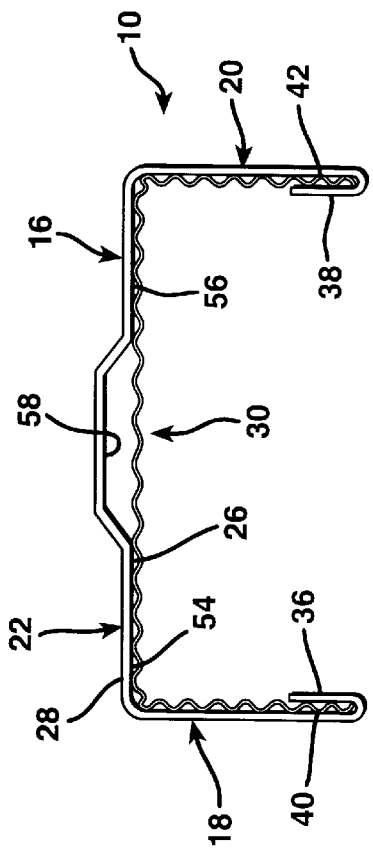
FIG. 2
FIG. 3

CHANNEL RASP

BACKGROUND OF THE INVENTION

1. Field of the Invention

The present invention relates to a unique construction of a rasp of the type used for smoothing a cut edge of material, such as a cut edge of gypsum board. The invention also relates to a method of smoothing a cut edge of material, such as gypsum board.

2. Description of the Prior Art

In the building trade, gypsum board, sometimes referred to as wallboard or drywall, is utilized extensively as the primary surfacing material forming the interior walls and ceilings of buildings. Although sold in other sizes, the wallboard is most often sold commercially in four foot by eight foot rectangular sections. Very frequently these sections must be cut to size to fit into corners and to accommodate window and door openings. Wallboard is typically cut to size using a conventional box cutter or utility knife.

In cutting wallboard it is very important not to cut the sheet of material too small, as this would leave gaps that require an extensive amount of time and labor to fill. As a consequence, drywall installers often tend to cut the wallboard pieces slightly oversize and then reduce the size slightly along the cut edge.

One implement that is widely utilized commercially for removing material from a cut edge of wallboard is an article known as a wallboard rasp. A conventional wallboard rasp is formed of two major components, namely a handle and an abrading element. The handle is very often fabricated from wood and is formed as a generally rectangular block, typically about six or seven inches in length, about two inches in width and one inch in thickness. A shallow trough is formed lengthwise down the center of the underside of the block while a pair of longitudinally extending narrow slots or crevices are formed along the sides of the block. The crevices are designed to receive the longitudinal edges of the abrading element.

The abrasive portion of the abrading element may be formed of an expanded metal sheet. Such an expanded metal abrasive sheet is formed from a thin sheet of metal in which a multiplicity of short slits are cut in parallel rows. The ends of the slits are offset from each other in adjacent rows. The sheet metal is then pulled laterally from opposite sides in a direction perpendicular to the alignment of the slits. This causes the slits to open and for the metal between the slots to twist so that the narrow strips of metal between the slits are twisted through large acute angles relative to their original alignment prior to expansion of the metal. The final orientation of the metal strips approaches an orientation perpendicular to their original coplanar alignment. The resulting structure bears somewhat of a resemblance to a screen, but has sharp metal edges facing outwardly at large acute angles relative to the plane of expansion of the metal sheet.

To create the abrasive element of a conventional wallboard rasp a section of the expanded metal sheet is cut to a size slightly shorter than the length of the wooden block handle and wide enough to cover the underside of the wooden block handle and extend a short distance up its sides. Sheet metal angles are then spot welded to the longitudinally extending side margins of the sheet of expanded metal. The spot welds connect the side margins of the sheet of expanded metal to one leg of each of the metal angles. The other leg of each metal angle is directed inwardly into one of the two narrow slots on the opposite sides of the wooden block handle. The abrasive element is thereby secured to the underside of the wooden block handle, but extends over the longitudinal edges of the underside at the transition between the underside and the side walls of the block.

A conventional wallboard rasp is constructed and used in a manner quite similar to a conventional sanding block. That is, the user grips the smooth upper portion of the wallboard rasp and runs the exposed edges of the expanded sheet metal section across a cut edge of wallboard. The sharp, exposed edges of the expanded sheet metal section are sharp enough to abrade away both the paper on the outer surface of the wallboard, and also the gypsum interior. The cut section of wallboard can then be abraded to the desired size and the cut edge of the wallboard will be smoothed in the process.

Conventional wallboard rasps perform their intended function quite adequately. However, they are also the source of many painful injuries. Since the expanded metal abrasive element is wrapped over the outer edges of a supporting block, there is a considerable exposure of sharp surface area that creates painful injuries with only light contact to the skin of a user. As a consequence, users must proceed slowly and carefully when utilizing this implement. Even so, many injuries result.

Furthermore, the transversely cut ends of the expanded metal present an additional source of injury. While the sheet of expanded metal forming the abrasive element is normally cut to a length slightly shorter than the supporting wooden block that serves as a handle so that the ends of the wooden block extend longitudinally beyond the ends of the expanded metal abrading element, the ends of the abrading element are still quite dangerous. This results from cutting the sheet of expanded metal to size. When the strips of metal that form the lattice to create a multiplicity of grid openings in the expanded metal are cut, short barbs are left that project outwardly at the cut ends of the expanded metal sheet. These barbs can sometimes become bent forwardly and project beyond the end of the underside of the wooden block handle. This exposure creates a considerable safety hazard. The ends can be capped with a folded over marginal strip of metal which is spot welded to encase therewithin the cut barbs at the ends of the sheet of expanded metal. However, this adds to the cost of fabrication of the product.

A further safety hazard is presented by the exposed longitudinal edges at the bottom of a conventional wallboard rasp. In such a conventional structure the sheet of expanded metal is wrapped at right-angles about the supporting wooden block at the longitudinal edges of the underside of the wooden support block. Due to the reflex angles through which the expanded metal sheet is bent, the longitudinally extending edges of the wallboard rasp at the transition between the underside and side walls of the tool are particularly dangerous due to their significant exposure. Even though users normally handle the tool with gloves, any abrasive contact between the exposed portions of the expanded metal rasp element and the fabric of the glove can cause the expanded metal to easily slice through the glove and create painful injuries. The incidences of injuries utilizing conventional wallboard rasps has been frequent enough so that many wallboard installers will not use them, even though they perform their intended function quite admirably.

SUMMARY OF THE INVENTION

A primary object of the present invention is to provide a rasp that is far safer to use than conventional rasps. This safety feature is achieved by configuring the supporting handle member in a manner precisely opposite to that in which a conventional supporting handle is configured. That is, instead of forming the rasp handle as a substantially solid, rectangular block, the handle of the invention is formed as a channel member having an inner concave surface and an outer convex surface. Moreover, instead of wrapping the sheet of extended metal rasping material over the exterior or outer surface of the support, the expanded metal sheet is instead placed against the inner, concave, channel-shaped surface of the support and secured thereto. By fabricating the rasp in this manner, the user is subjected to far less exposure to the abrading element than is possible with conventional wallboard rasps. Nevertheless, the rasp can still perform its intended function since the channel is wide enough to span the cut edge of the wallboard so that abrasive contact can be made between the rasping element and the cut wallboard edge.

A further advantage of the novel rasp of the invention is that it can be fabricated far more economically than conventional wallboard rasps. This is because the support or grip can be formed of a section of sheet metal bent into a channel shape, rather than a solid block of wood. The material cost of the grip is considerably less than with a conventional rasp. Moreover, the cost of fabrication is greatly reduced because no spot welding is necessary in order to secure the abrasive sheet of expanded metal to the channel-shaped supporting grip. To the contrary, lips at the exposed edges of the longitudinally extending side walls of the grip can be bent over into the channel and back against the side walls of the channel to clamp the longitudinally extending side marginal edges of the expanded metal rasping element against the side walls of the channel. This immobilizes the sheet of expanded metal relative to its supporting structure without the necessity for any spot welding. Thus, the manufacturer does not need to entail the very large expense of initial purchase of a spot welding machine in order to produce the devices. Moreover, the expense of replacing copper spot welding tips is likewise totally avoided.

In one broad aspect the invention may be considered to be a rasp formed of a stiff sheet of backing material fashioned into a longitudinally extending, channel-shaped grip. The grip has a web that extends transversely between a pair of mutually parallel channel walls, thereby defining a concave inner channel surface. A rasping or abrading element is provided that conforms to and contacts the concave inner surface of the channel throughout, and is firmly secured thereto. The abrading element is preferably a sheet of expanded metal inelastically deformed to define a pattern of a multiplicity of grid openings that are delineated from each other by strips of metal interconnected to form a lattice with the grid openings defined therebetween In another broad aspect the invention may be considered to be a rasp for removing materials at a cut edge of a structure comprising: a rigid, channel-shaped grip having a pair of mutually parallel, longitudinally extending side walls joined to each other by a web extending transversely therebetween. The web and side walls thereby form inner and outer channel surfaces. A sheet of expanded metal is employed as an abrading element. The sheet of expanded metal is inelastically deformed to define a multiplicity of grid openings delineated from each other by a lattice of intervening metal strips. The sheet of expanded metal is bent to conform to the shape of the inner channel surface of the grip and to reside in contact therewith. The sheet of expanded metal is firmly secured to the inner channel surface of the grip.

In still another broad aspect the invention may be considered to be a method of removing material from a cut edge of a structure. The method is comprised of the steps of first fashioning a rasp in a novel manner. The rasp is constructed by forming a backing member as a smooth surfaced channel with a concave inner surface and a convex outer surface. A sheet of expanded metal is provided that is inelastically formed into an abrading grid that defines a multiplicity of grid openings delineated from each other by a lattice of metal strips. The sheet of expanded metal is placed into contact with the concave inner surface of the channel and is firmly secured against the concave surface of the backing member. The user then manually grips the convex outer surface of the backing and places the rasp backing member so that the cut edge of the structure extends into the channel and contacts the sheet of expanded metal. The user then runs the rasp along the cut edge of the structure while pressing the abrading grid against the structure to thereby abrade away material from the cut edge of the structure.

The sheet of backing material is preferably formed of metal and the mutually parallel channel walls are preferably each provided with a lip remote from the backing material web. The lip extends the length of the backing material. The sheet of expanded metal is provided with a pair of mutually parallel, longitudinally extending side margins that contact and are parallel to the channel walls. These side margins reside adjacent to the lips of the backing material. The lips are bent inelastically inwardly toward the backing material web to capture and crimp the adjacent longitudinal margins of the sheet of expanded metal. The lips thereby clamp the longitudinally extending side margins of the sheet of expanded metal against the side walls of the backing material to immobilize the sheet of expanded metal within the channel. The potentially dangerous barbs extending along the side margins of the cut sheet of expanded metal are thereby encapsulated within the structure of the backing material without the necessity for any spot welding.

Preferably also the sheet of expanded metal is cut to a slightly shorter length than the channel-shaped backing member. The structure of the channel-shaped backing member thereby extends longitudinally beyond the structure of the sheet of expanded metal at both ends of the rasp. Since the barbs at both ends of the transverse end margins of the sheet of expanded metal are recessed from the transverse end edges of the backing member, and since the sheet of expanded metal is formed into a generally U-shaped configuration within the confines of the channel-shaped backing member, there is little opportunity for contact between the transverse ends of the sheet of expanded metal and anything other than a cut edge of a structure that is purposely inserted into the channel formed by the backing material.

A rasp formed according to the present invention is far safer to use than a conventional rasp. Furthermore, it can be fabricated much more economically since it requires no spot welding, no angle pieces to cover the longitudinally extending side margins of the sheet of expanded metal, and a grip of considerably lighter weight and smaller volume than conventional devices.

The invention may be described with greater clarity and particularity by reference to the accompanying drawings.

DESCRIPTION OF THE DRAWINGS

FIG. 2 is a bottom plan view of the rasp of FIG. 1.

FIG. 3 is an end view of the rasp of FIG. 2 taken along the lines 3—3 thereof.

DESCRIPTION OF THE EMBODIMENT AND IMPLEMENTATION OF THE METHOD

Figure 1:
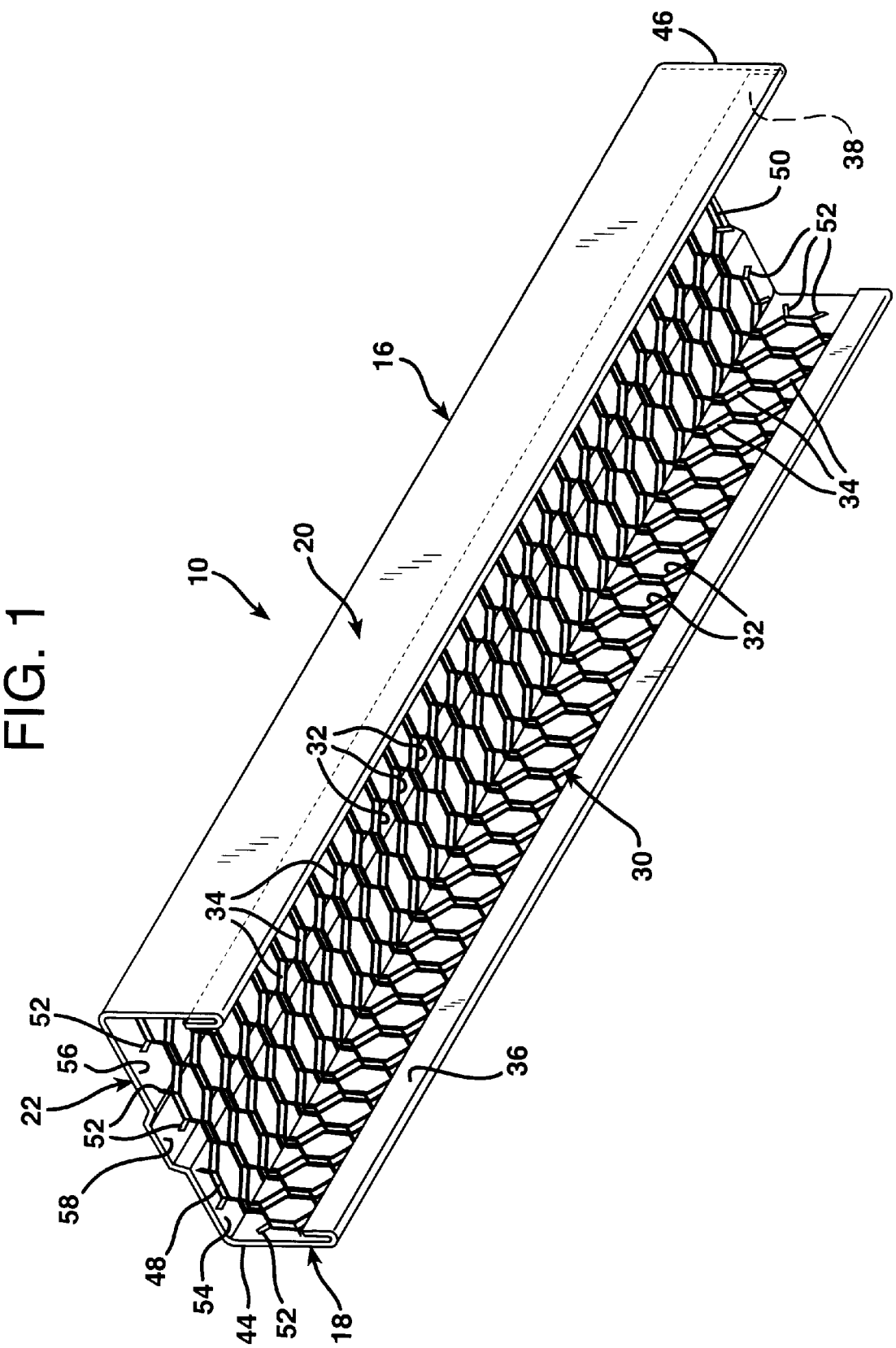
FIG. 1 is a perspective view illustrating the underside of a rasp constructed according to the present invention.

FIG. 1 illustrates a rasp constructed according to the invention generally at 10. The rasp 10 is designed for the purpose of removing material from a structure, such as at the cut edge 12 of the sheet of wallboard 14 illustrated in FIG. 4.

With reference to FIGS. 1–3, the rasp 10 is formed of a stiff sheet of backing material, such as sixteen to twenty gauge aluminum or galvanized steel. The sheet of backing material is fashioned into a rigid, channel-shaped grip 16 having a pair of mutually parallel, longitudinally extending side walls 18 and 20 joined to each other by a transversely extending web 22. Together the side walls 18 and 20 and the web 22 form the rigid channel-shaped grip 16 so as to define a concave, U-shaped inner channel surface 26 and a convex, inverted U-shaped outer channel surface 28.

The rasp 10 is also formed of a sheet of expanded metal 30 that is inelastically deformed in a conventional manner. Specifically, the expanded metal sheet 30 is deformed to define a multiplicity of grid openings 32 having a generally hexagonal shape and which are delineated from each other by a lattice of intervening metal strips 34. The expanded metal sheet 30 is fabricated in a conventional manner and is cut to size to fit within the inner surface 26 of the channel-shaped grip 16. Specifically, the expanded metal sheet 30 is bent longitudinally along two lines of bending to conform to the shape of the inner channel surface 26 of the grip 16.

As best illustrated in FIGS. 1 and 3, the expanded metal sheet 30 resides in contact with the interior channel-shaped surface 26 and is secured thereto by a pair of longitudinally extending lips 36 and 38. The lips 36 and 38 are provided on the mutually parallel channel side walls 18 and 20 and are located remote from the backing material web 22. The lips 36 and 38 extend the length of the channel-shaped structure of the grip 16.

As best illustrated in FIG. 3, the sheet 30 of expanded metal is provided with a pair of mutually parallel, longitudinally extending side margins indicated at 40 and 42. The side margins 40 and 42 contact and are parallel to the channel walls 18 and 20 and reside adjacent to the lips 36 and 38 formed by the backing material structure.

Once the sheet 30 of expanded metal has been positioned within the channel of the grip 16 against the concave interior channel surface 26 thereof, the lips 36 and 38 of the sheet metal backing material are inelastically bent inwardly back toward the side wall 18 and 20 of the grip 16 to clamp the longitudinally extending side edge margins 40 and 42 of the expanded metal sheet 30 thereagainst and against the inner channel surface 26 of the grip 16. The expanded metal sheet 30 is thereby totally immobilized within the structure of the grip 16 without any necessity for spot welding or other form of fastening.

As best illustrated in FIG. 2, the channel-shaped grip 16 has transverse end edges 44 and 46 that extend across its width. The grip 16 is preferably between about six and seven inches in length so that the distance between the transverse end edges thereof is likewise six or seven inches.

The sheet 30 of expanded metal has transversely extending end margins 48 and 50. The end margins 48 and 50 may be considered to be the area on the expanded metal sheets 30 at which the short but very sharp barbs 52 are formed where the expanded metal sheet 30 is cut transversely. The barbs 52, if exposed, would represent lethal safety hazards. However, since the sheet of expanded metal 30 is cut to a slightly shorter length than the channel-shaped grip 16, the end margins 48 and 50 of the expanded metal sheet 30 reside inwardly from the transverse end edges 44 and 46 of the grip 16. Preferably, the end margins 48 and 50 of the expanded metal sheet 30 are spaced a distance of at least one-eighth of an inch from the transverse end edges 44 and 46 of the grip 16. The end edges 44 and 46 of the grip 16 thereby reside longitudinally beyond the end margins 48 and 50 of the expanded metal sheet 30.

The longitudinal end extremities of the lips 36 and 38 are pressed tightly against the side walls 18 and 20, respectively, in the spaces between the end edges 44 and 46 of the grip 16 and the end margins 48 and 50 of the expanded metal sheet 30. This aids in longitudinally immobilizing the expanded metal sheet 30 relative to the grip 16.

As best illustrated in FIG. 3, the web 22 is formed with longitudinally extending side margins 54 and 56 that are adjacent and perpendicular to the side walls 18 and 20 of the grip 16. The web 22 is also formed with a longitudinally extending central trough 58 on the inner channel surface 26. The sheet 30 of expanded metal resides in contact with the inside surfaces of the side margins 54 and 56 of the web 22 and spans the central trough 58. The separation between the structure of the web 22 at the trough 58 and the portion of the expanded metal sheet 30 directly therebeneath provides a tunnel that allows material scraped free of the wallboard 14 to escape from the ends of the rasp 10. The side margins 54 and 56 of the web 22 are of a width to provide sufficient structural support to hold the portion of the expanded metal sheet 30 adjacent the web 22 in substantially planar relationship. The trough 58 is preferably slightly wider than the widest drywall sheet 14 with which it is likely to be used. Typically, drywall sheets 14 are provided with a maximum thickness of about three-quarters of an inch.

Figure 4:
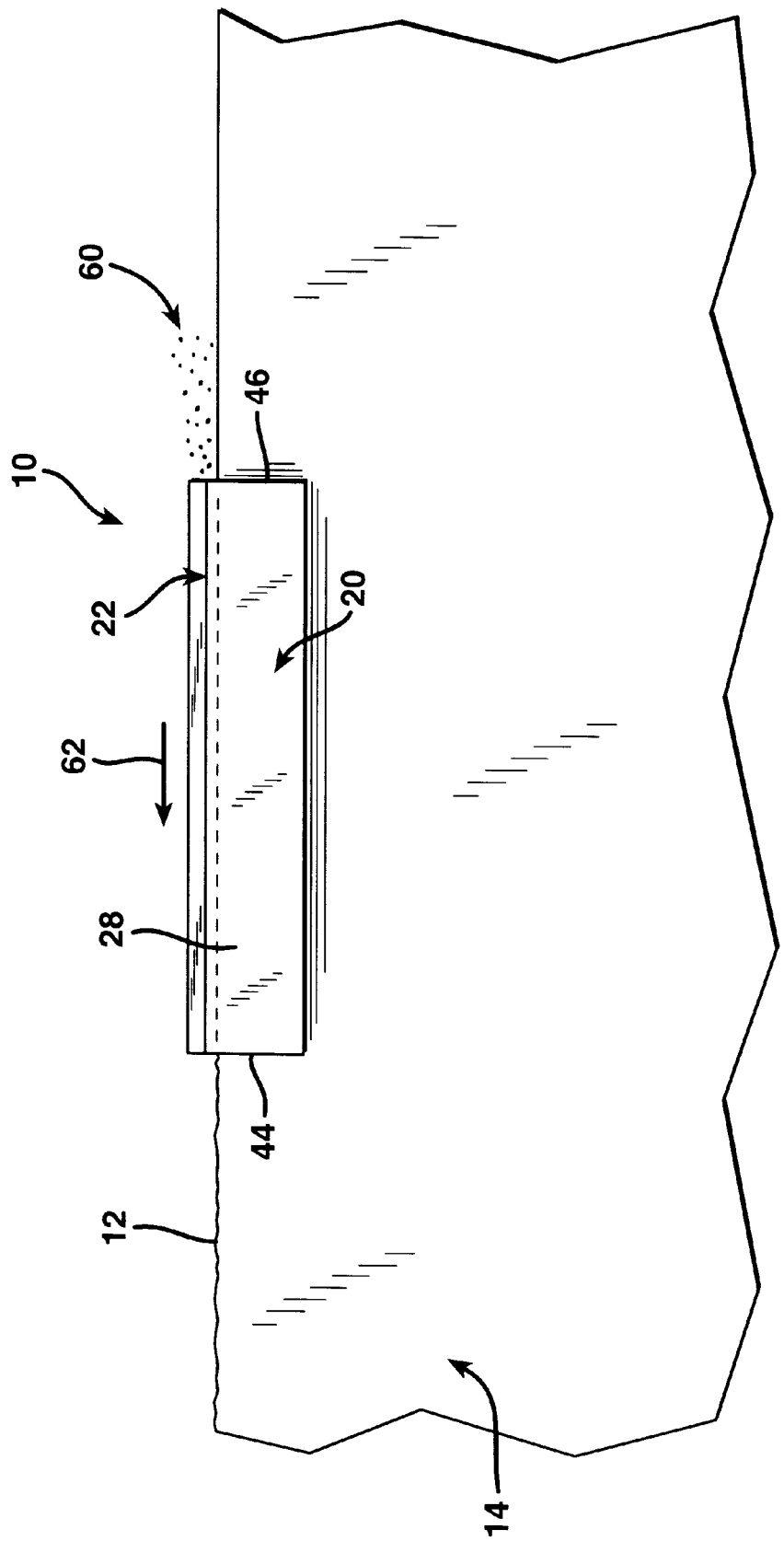
FIG. 4 is a side elevational view illustrating the manner of use of the rasp of FIGS. 1–3.

The centrally located, concave inwardly facing trough 58 between the side margins 54 and 56 of the web 22 provides an avenue of escape for the powdered drywall material rasped free from the cut end 12 of the drywall sheet 14, illustrated in FIG. 4. The escape of this material as a spray of powder is indicated generally at 60 in FIG. 4.

The method of removing drywall material from the cut edge 12 of drywall is illustrated in FIG. 4. The rasp 10 is formed in the manner depicted and described with reference to FIGS. 1–3. The rasp 10 is gripped by its outer convex surface 28 and is oriented so that the cut end 12 of drywall resides directly beneath and parallel to the trough 58. The grip or backing member 16 is then placed so that the cut edge 12 of the drywall sheet 14 extends longitudinally into the channel formed within the grip 16 and contacts the region of the expanded metal sheet 30 that extends across and lies immediately adjacent to the web 22. The rasp 10 is then run along the cut edge 12, as indicated by the directional arrow 62 while the user presses the abrading grid of the expanded metal sheet 30 against the cut edge 12 of the drywall sheet 14. This causes the abrading away of material protruding from the cut edge 12 and smoothing of the cut edge of the drywall sheet 14. This abraded, powdered residue 60 escapes from the confines of the grip 16 through the trough 58 in a powdery discharge as illustrated in FIG. 4.

Undoubtedly, numerous variations and modifications of the invention will become readily apparent to those familiar with rasping tools. For example, the grip 16 need not necessarily be formed of metal, but could instead be formed of plastic. Also, the abrading element, although preferably formed of 2.5 gauge or 3.4 gauge expanded metal, does not necessarily have to be formed of a sheet of expanded metal, but can be formed of another type of abrading material, such as a perforated metal sheet, or even a backing to which coarse grit is attached. Also, some other means of securing the rasping element within the channel-shaped grip could be employed. For example, longitudinally extending flanges could be formed on the ends of the side walls of the grip instead of, or in addition to, the lips 36 and 38. These flanges could then be folded back against the inside surface 26 of the structure to provide further or alternative longitudinal immobilization of the rasping element relative to the channel-shaped grip. Accordingly, the scope of the invention should not be construed as limited to the specific embodiment thereof illustrated nor the single manner of implementation described.

I claim:

1. A rasp formed by a stiff sheet of backing material fashioned into a longitudinally extending channel-shaped grip having a backing material web that extends transversely between a pair of mutually parallel channel walls thereby defining a concave inner channel surface, and wherein said mutually parallel channel walls are each provided with a lip remote from said backing material web and extending the length of said backing material, and an abrading element comprised of a sheet of expanded metal inelastically deformed to define a pattern of a multiplicity of grid openings that are delineated from each other by strips of metal interconnected together to form a lattice with said grid openings therebetween, and said abrading element has a pair of mutually parallel, longitudinally extending side margins that contact and are parallel to said channel walls and which reside adjacent to said lips of said backing material, and said abrading element conforms to and contacts said concave inner surface of said channel throughout, and said lips are bent inelastically inwardly toward said backing material web to capture and grip said side margins of said sheet of expanded metal, thereby firmly securing it to said backing material.

2. A rasp according to claim 1 wherein said grip has transverse end edges that extend across its width, and said sheet of expanded metal has transversely extending end margins which are longitudinally recessed from said transverse end edges of said grip.

3. A rasp according to claim 2 wherein said end margins of said sheet of expanded metal are spaced a distance of at least one eighth of an inch from said transverse end edges of said grip.

4. A rasp according to claim 1 wherein said web has longitudinally extending side margins oriented perpendicular to said channel walls and a longitudinally extending, centrally located, concave inwardly facing trough between said side margins of said web, and said sheet of expanded metal resides in contact with said side margins of said web and spans said centrally located trough of said web.

5. A rasp according to claim 1 wherein said lips are turned back toward said channel walls to clamp said side margins of said sheet of expanded metal against said channel walls, and said grip has transversely extending end edges that reside longitudinally beyond said end margins of said sheet of expanded metal.

6. A rasp for removing material at a cut edge of a structure comprising:

a rigid channel-shaped grip having a pair of mutually parallel, longitudinally extending side walls joined to each other by a web therebetween to thereby form inner and outer channel surfaces, a sheet of expanded metal inelastically deformed to define a multiplicity of grid openings delineated from each other by a lattice of intervening metal strips, wherein said sheet of expanded metal is bent to conform to the shape of said inner channel surface and resides in contact therewith, and said sheet of expanded metal has longitudinally extending side edge margins and said grip is formed of sheet metal and said side walls of said grip are provided with longitudinally extending lips at their extremities, and said lips are inelastically bent inwardly back toward said side walls to clamp said longitudinally extending side edge margins of said sheet of expanded metal thereagainst, thereby securing said sheet of expanded metal to said inner channel surface of said grip.

7. A rasp according to claim 6 wherein said sheet of expanded metal has longitudinal ends and said grip has transversely extending end edges and said grip is longer than said sheet of expanded metal, and said sheet of expanded metal is secured to said grip so that said end edges of said grip reside longitudinally beyond said longitudinal ends of said sheet of expanded metal.

8. A rasp according to claim 6 wherein said web is formed with longitudinally extending side margins that are adjacent perpendicular to said side walls of said grip and a longitudinally extending, central trough on said inner channel surface, and said sheet of expanded metal resides in contact with said side margins of said web and spans said central trough.

9. A rasp according to claim 6 wherein said lips are bent inwardly to clamp said sheet of expanded metal against said inner channel surface of said grip.

* * * * *